United States Patent [19]
Thornton

[11] Patent Number: 5,915,015
[45] Date of Patent: *Jun. 22, 1999

[54] TELEPHONE HAVING SEALED ACOUSTICAL PASSAGEWAY THROUGH FLIP COVER HINGE

[75] Inventor: Curtis Wayne Thornton, Cary, N.C.

[73] Assignee: Ericsson, Inc., Research Triangle Park, N.C.

[*] Notice: This patent is subject to a terminal disclaimer.

[21] Appl. No.: 08/709,251

[22] Filed: Sep. 10, 1996

[51] Int. Cl.$^6$ ...................................................... H04M 1/00
[52] U.S. Cl. ........................................... 379/433; 379/434
[58] Field of Search .................................... 379/433, 428, 379/434; 455/90, 575

[56] References Cited

FOREIGN PATENT DOCUMENTS 0 275 996 B1   4/1993   European Pat. Off. .

*Primary Examiner*—Jack Chiang
*Attorney, Agent, or Firm*—Jenkens & Gilchrist, P.C.

[57] ABSTRACT

An acoustical passageway is provided between a flip cover and a body member of a radiotelephone, such as a cellular telephone, by directing a portion of the passageway through the hinge connecting the two components in a direction coaxially aligned with the axis of rotation of the cover with respect to the body. The internal passageway extends from an aperture provided at a predetermined position in the cover, through a hinge pin connecting the cover to the body member, and thence through an internally extending passageway in the body member to a microphone disposed in the body member. The acoustical path between the apertures in the cover and the microphone remains sealed irrespective of the open or closed position of the cover. The interconnection between the passageway disposed in the cover and the passageway disposed in the body member is maintained in biased abutment as a result of an interference fit between the respective components. The biased abutment is maintained even after extended, prolonged use of the radiotelephone.

12 Claims, 3 Drawing Sheets

TELEPHONE HAVING SEALED ACOUSTICAL PASSAGEWAY THROUGH FLIP COVER HINGE

BACKGROUND OF THE INVENTION

1. Technical Field

This invention relates generally to portable radiotelephones that have a protective cover pivotally mounted to the body of the phone, and more particularly, to such a radiotelephone having a microphone disposed in the body in communication with an acoustical passageway disposed in the cover.

2. History of Related Art

As portable radiotelephones, and cellular telephones in particular, become smaller and smaller, it has been increasingly difficult to provide sufficient distance between the speaker, or earpiece, and the microphone providing audio pickup. Typically, small cellular telephones have a cover, commonly referred to as a "flip," which is pivotally mounted to the body of the cellular telephone and covers at least a portion of the telephone such as the keypad. One approach to providing sufficient distance between the speaker and microphone has been to mount the microphone at a distal end of the flip, so that when the flip is in the open position, the microphone is disposed in the approximate area of a user's mouth. However, this approach requires that either an electrical circuit be established through the hinge connection of the flip to the body, or a flexible connector be provided between the flip cover and the body. Both of these arrangements are prone to wear and subsequent degradation of the electrical signal from the microphone to the circuits disposed in the main body of the telephone.

In other cellular telephone arrangements, the microphone has been positioned in the main body of the telephone at a distance as far as possible from the speaker. However, with small instruments, this results in the microphone being positioned at a considerable distance from a typical user's mouth. As a result, audio input quality drops, since the microphone is not near the mouth. The resulting reduction in the voice level of the user also undesirably increases the amount of background noise that is picked up by the microphone.

One attempt to solve the problem of voice pickup in small hand-held radiotelephone instruments is described in European Patent Office Publication No. 0 275 996 B1. The EPO publication provides a sealed acoustical path from a slot in the flip cover to a microphone disposed in the body of the instrument. The acoustical path passes through the hinge connection of the flip cover to the body. The acoustical path is operative when the flip is extended to an open position. However, the arrangement described in the EPO publication has several inherent problems. First, the arrangement does not provide compensation for wear that may occur between the body housing and the flip hinge. As the flip is opened and closed over time, the seal may wear and lose its ability to provide a sealed acoustical path. Secondly, when the flip is closed, the channel through the flip hinge is open, thereby creating an opportunity for material such as lint, food, dirt, and other debris to enter and subsequently block the acoustical path when the flip is open. Thirdly, the fully open position of the flip must be maintained during voice communication so as not to block, or even partially close, the passageway to the microphone. Even small movements of the flip, such as being inadvertently bumped by the user, may cause the flip to become displaced from its fully open position and create misalignment between the acoustical passageway in the flip and the acoustical passageway in the body.

The present invention is directed to overcoming the problems set forth above. It is desirable to have a sealed acoustical path between an aperture provided in the flip cover of a small telecommunication instrument and a microphone disposed in the body of the instrument that has a biased connection between the flip and body to compensate for wear induced by use of the instrument over an extended period of time. It is also desirable to have such an instrument that provides a sealed path through the hinge interconnection of the two components that is closed at all times, eliminating the potential collection of foreign matter and subsequent blockage of the passageway. Furthermore, it is desirable to have such an instrument in which the acoustical path between the flip and body remains open and aligned irrespective of the open, closed, or intermediate position of the flip cover.

SUMMARY OF THE INVENTION

In accordance with one aspect of the present invention, a radiotelephone has a body member in which an internal passageway extends inwardly from a defined surface of the body member, and a cover pivotally attached to the body member and rotatable about a predefined axis between a closed position and an open position. The axis of rotation extends through predetermined portions of the body member and the cover. The cover also has an internally disposed passageway with a first portion coaxially aligned with the predefined axis of rotation and a second portion in communication with the first portion of the passageway and an aperture extending from a selected surface of the cover to the second portion of the passageway. The radiotelephone further includes a microphone disposed within the body member that is in communication with the internally extending passageway of the body member. The passageway of the body member has at least a portion disposed in coaxial alignment with the axis of rotation of the cover and in communication with the first portion of the internally disposed passageway in the cover.

Other features of the radiotelephone embodying the present invention include a body member having a recess forming a portion of the defined surface of the body member. The recess is concentrically disposed with respect to the axis of rotation of the cover. The cover also includes a hinge pin having an externally disposed first end with an opening in the first end that is in communication with the first portion of the internally disposed passageway of the cover. The externally disposed first end of the hinge pin is adapted to forcibly abut the recess of the body member when the cover is assembled to the body member.

Other features of the radiotelephone embodying the present invention include the hinge pin being integrally formed with the cover, and an annular seal disposed between the externally disposed first end of the hinge pin and the recess of the body member. Still other features include the hinge pin being separately formed from the cover and having a second end that is internally disposed within the cover and axially movable with respect to the cover in a direction along the axis of rotation of the cover. In this arrangement, the radiotelephone includes an annular seal disposed between the second end of the hinge pin and the cover. In either arrangement, the seal is preferably formed of an elastic material.

In accordance with another aspect of the present invention, an apparatus for guiding sound into a radiotelephone includes a cover having first and second ends, and a means for hinging the cover to the radiotelephone at the first end. The means for hinging has an axis about which the cover rotates when hinged to the radiotelephone. The apparatus further includes an acoustical path defined by at least one inlet for receiving sound at the second end of the cover, an outlet for transmitting sound out of the cover that is aligned with the axis of the means for hinging, and a hollow section disposed in the cover connecting at least one inlet with the outlet.

Other features of the apparatus for guiding sound into a radiotelephone embodying the present invention include a means for acoustically sealing the outlet of the acoustical path to an opening in the radiotelephone when the cover is hinged onto the radiotelephone. Furthermore, other features include the outlet of the acoustical path comprising a hollow pin having a first surface facing the opening when the cover is hinged onto the radiotelephone and a second surface facing a direction opposite the first surface. The pin is preferably formed of a low-friction material. In one embodiment, the hollow pin is fixed with respect to the cover, whereas in another embodiment the hollow pin is movable with respect to the cover. Still another feature of the apparatus embodying the present invention includes the means for acoustically sealing the outlet to an opening in the radiotelephone when the cover is hinged onto the radiotelephone comprising first and second spring arms, the first spring arm providing a force in a first direction around the opening when the cover is hinged onto the telephone, and the second arm providing force in a second direction opposite to the first direction when the cover is hinged onto the radiotelephone.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
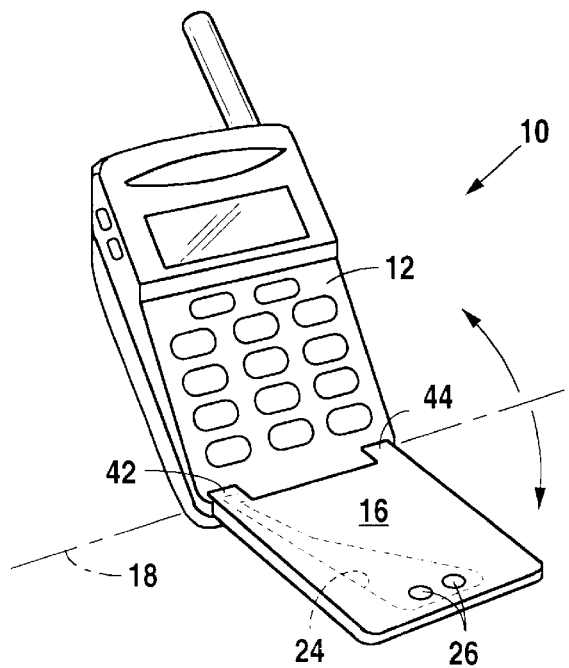
FIG. 1 is a three-dimensional view of a cellular telephone embodying the present invention.
Figure 2:
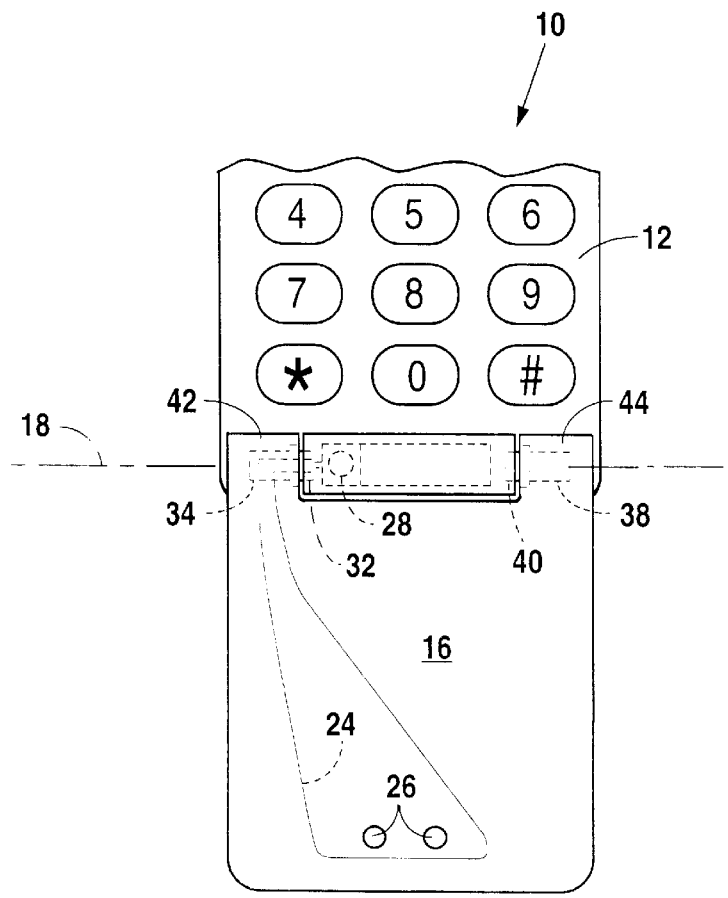
FIG. 2 is a partial plan view of the cellular telephone, shown in FIG. 1, embodying the present invention.

In the following exemplary embodiments, the portable telecommunication instrument, or radiotelephone, embodying the present invention is described with specific reference to a cellular telephone 10. In the exemplary embodiment, the cellular telephone 10 has a body member 12 which houses a keypad, LCD display screen, antenna, and electrical circuitry necessary for operation of the instrument. As best shown in FIGS. 3–6, the body member 12 has an internal passageway 14 that extends inwardly from a defined surface of the body member 12.

The cellular telephone 10 also includes a cover, or flip, 16 that is pivotally attached to the body member 12 and is rotatable about a predefined axis 18 that extends through portions of the body member 12 and the cover 16. The cover 16 is rotatable about the axis 18 between a closed position at which the cover is disposed in covering relationship over the keypad of the body member 12 and an open position in which the cover 16 is spaced from the keypad portion of the body member 12. Importantly, the cover 16 has an internally disposed passageway 20 that has a first portion 22, coaxially aligned with the axis of rotation 18, and a second portion 24 that cooperate to form an acoustic horn that is in communication with one or more apertures 26 that extend from the surface of the cover 16 to the second portion 24 of the passageway 20.

A microphone 28 is disposed within the body member 12 in communication with the internally extending passageway 14 of the body member 12. The internally extending passageway 14 has at least a portion disposed in coaxial alignment with the axis of rotation 18 of the cover 16, and is arranged so that it is in communication with the first portion 22 of the passageway 20 formed in the cover 16.

Figure 4:
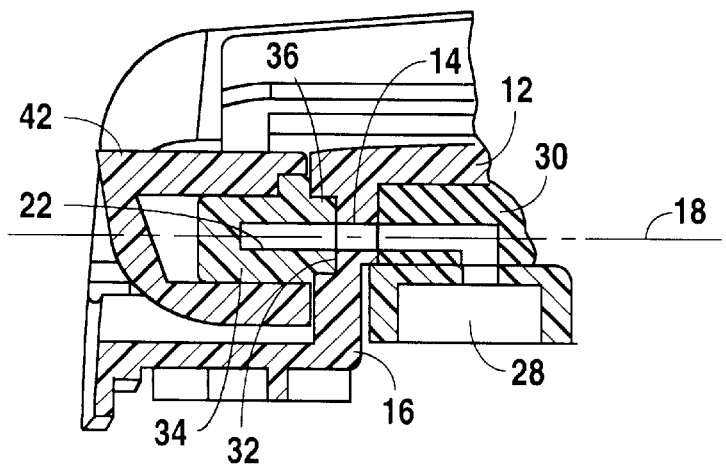
FIG. 4 is an enlarged cross-sectional view of the hinged interconnection between the cover and body components of the cellular telephone embodying the present invention.

Desirably, as shown in FIG. 4, a rubber seal 30 having an internal opening aligned with the internal passageway 14, is disposed within the body member 12 to provide an acoustic seal around the microphone 28. Thus, it can be seen that an enclosed acoustic path is provided between the apertures 26 in the cover 16 and the microphone 28 disposed in the body member 12.

Figure 3:
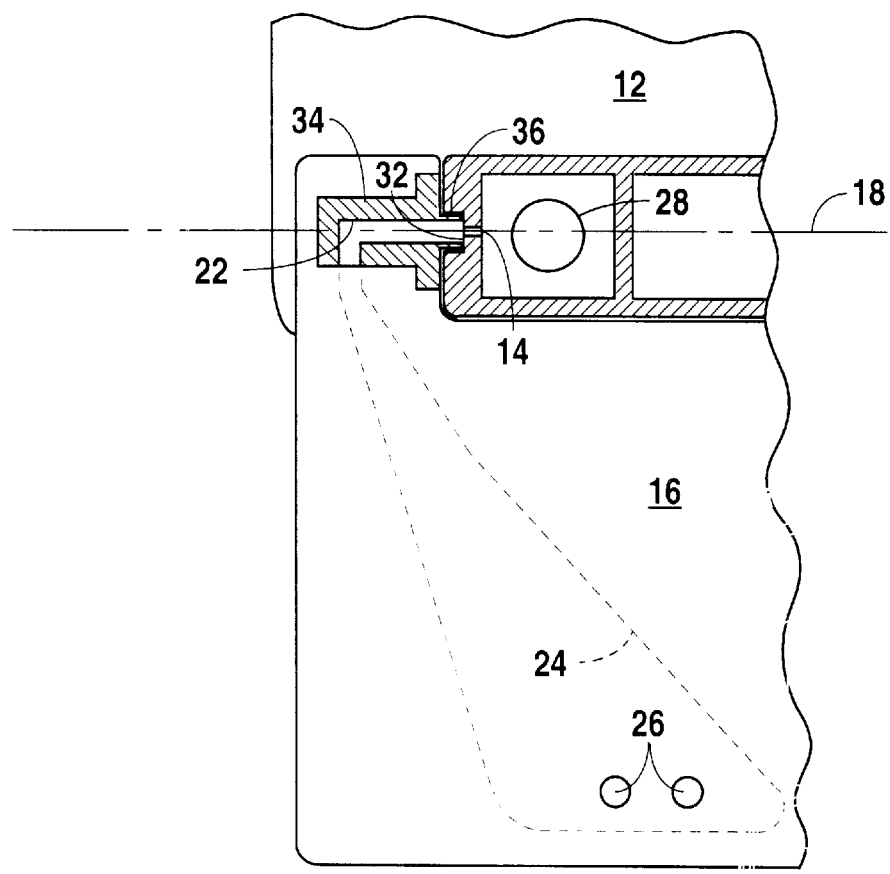
FIG. 3 is an enlarged plan view of the cellular telephone embodying the present invention, as shown in FIG. 2, with portions of the cover and body shown in section to better illustrate the interconnection between the two members.
Figure 5:
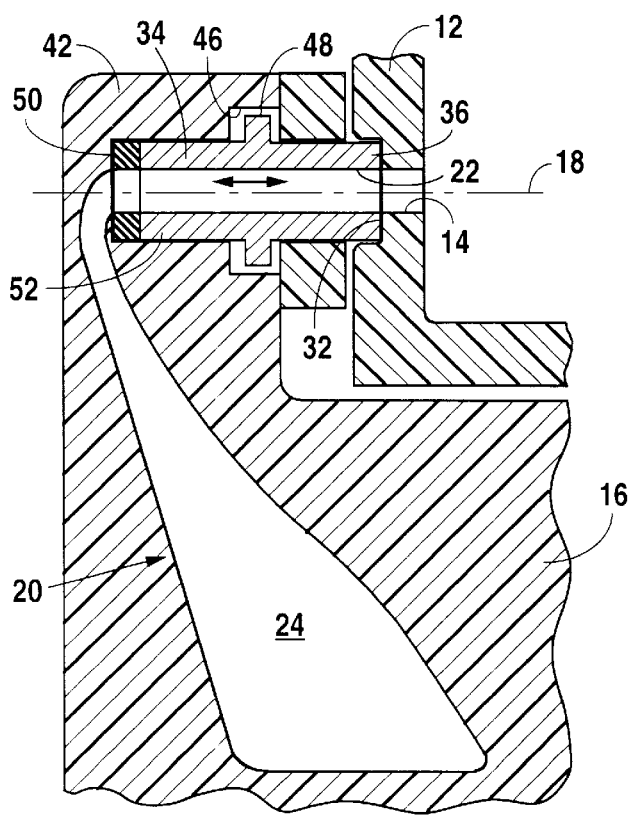
FIG. 5 is an enlarged planar sectional view of a portion of the cover and body components of another embodiment of a telecommunication instrument embodying the present invention, showing details of the hinged interconnection between the two components.
Figure 6:
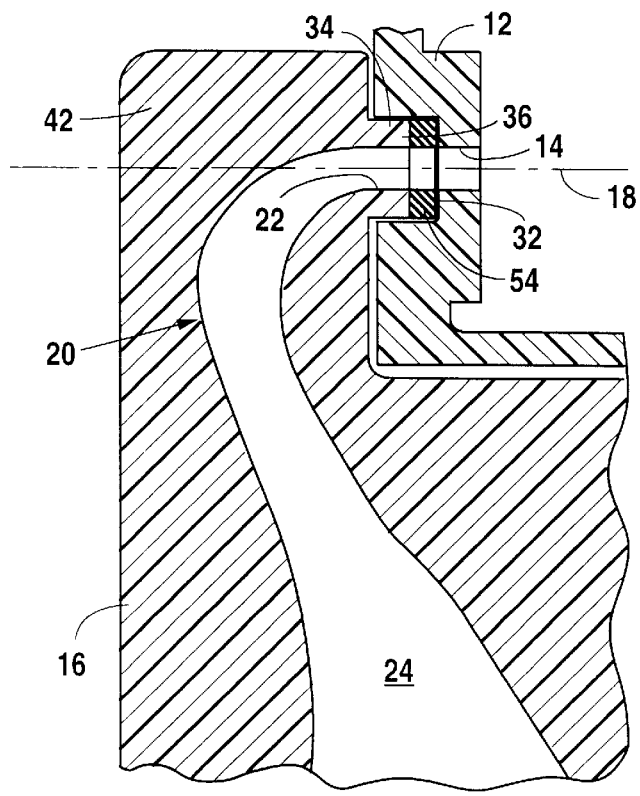
FIG. 6 is an enlarged planar sectional view of yet another embodiment of the telecommunication instrument embodying the present invention, showing the hinged interconnection between the cover and body components of the instrument.

The hinge interconnection between the cover 16 and the body member 12 may be provided by several different arrangements. Typically, the body member 12 has a recess 32 forming a portion of the defined surface of the body member 12, and is concentrically formed in the body member 12 with respect to the axis of rotation 18 of the cover 16. Also, the cover 16 typically includes a hinge pin 34 that may be either integrally formed with the cover 16, as shown in FIGS. 3 and 6, or formed as a separate member, as shown in FIGS. 4 and 5. In all of the arrangements, the hinge pin 34 has an externally disposed first end 36 with an opening formed therein in communication with the first portion 22 of the passageway 20 internally disposed within the cover 16.

The first end 36 of the hinge pin 34 forcibly abuts, either directly or indirectly, the recess 32 formed in the body member 12. When the first end 36 of the hinge pin 34 is in direct abutting contact with the recess 32, it is desirable that at least one, and preferably both, of the directly abutting members be formed of a material having a low coefficient of friction and high wear properties, for example acetal resin thermoplastics such as Delrin, an acetal homopolymer resin produced by Dupont, and Celcon, a copolymer produced by Celanese. Forced abutment of the first end 36 of the hinge pin 34 with the recess 32 of the body member 12 is advantageously provided by an interference fit between the two members. Typically, the cover 16 has a second pin 38 disposed at an opposite side of the cover in coaxial alignment with the axis of rotation 18. In a similar manner, the body member 12 has a second recess 40 formed on an opposite side of the lower portion of the body member 12, in coaxial alignment with the axis of rotation 18. The distance between the external ends of the hinge pins 34, 36 is somewhat less, for example on the order of about 0.25 mm less, than the distance between the recesses 32, 40 formed in the body member 12. The cover 16 is assembled to the body member 12 by pressing the cover 16 downwardly over the lower portion of the body member 12, thereby spreading the short arm portions 42, 44 of the cover adjacent the hinge pins 34, 38 apart by a distance sufficient to permit the external ends of the pins 34, 36 to clear the body member 12. When assembled, there will be an interference fit, for example about 0.25 mm in the above described illustrative example, between the external ends of the hinge pins 34, 38 and the recesses 32, 40. Thus, upon seating after assembly, the external ends of the hinge pins 34, 36 forcibly abut the corresponding recesses 32, 40 formed in the body member 12.

When formed as a separate component, the hinge pin 34 may be tightly mounted within a cavity provided in the cover 16 as illustrated in FIG. 4, or be axially movable with respect to the cover in a direction along the axis of rotation 18, as illustrated in FIG. 5. In the FIG. 5 arrangement, an annular recess 46 is provided in the cover 16 to receive an annular shoulder 48 formed on the hinge pin 34. The recess 46 has a depth that is greater than the thickness of the annular shoulder 48 so that the pin 34 can move axially within the recess 46 and the opening provided in the housing for the pin 34. The hinge pin 34 is retained within the cover 16 by an annular ring that is attached to the cover 16, such as by an adhesive or ultrasonic welding, after installation of the hinge pin 34. An annular seal member 50 is disposed between a second end 52 of the hinge pin 34 and the cover 16. Desirably, the seal 50 is formed of an elastomeric material that has an uncompressed thickness sufficient to provide a bias force against the hinge pin 34, when compressed as a result of assembly of the cover 16 to the body member 12, and thereby urge the first end 36 of the hinge pin 34 into biased contact with the surface of the recess 32 provided in the body member 12. Upon assembly of the cover 16 with the body member 12, the seal member 50 is in a compressed state. Furthermore, the seal 50 has a central bore 54 that forms a portion of the first portion 22 of the internal passageway 20 of the cover 16.

In the fixed pin arrangement, as shown in FIG. 6, an annular elastomeric seal 54 may be provided between the first end 36 of the hinge pin 34 and the recess 22 formed in the body member 12 to assure a tight acoustic seal between the first portion 22 of the passageway 20, disposed in the cover 16, and the internally extending passageway 14 of the body member 12. In all of the above described embodiments, tight abutment of the hinge element 34 of the cover 16 with the receiving recess surface 32 of the body member 12, in which aligned passageways are respectively formed in each member, assures a tight, sealed acoustical path extending from the apertures 26, provided in the cover 16, to the microphone 28 disposed in the body member 12.

Thus, it can be seen that the present invention provides an apparatus for guiding sound into a radiotelephone 10 having a cover 16 hinged to the radiotelephone 10. Furthermore, the present invention provides a means for hinging the cover 16 to the radiotelephone 12 whereby the cover is rotatable about an axis 18 and provides an acoustical path defined by an aperture 26 communicating with an internal passageway 20 disposed in the cover 16. In the disclosed embodiments, a means for acoustically sealing an outlet of the acoustical path 20 provided in the cover 16 to an opening 14 provided in the body 12 of the radiotelephone 10 comprises the first and second spring arms 42, 44 formed on the cover 16 that are spaced apart a predetermined distance that is less than the spaced apart distance of the mating surfaces on the body member 12 of the radiotelephone 10. Upon assembly, the first arm 42 provides a force in a first direction around the cover passageway opening 20 and the second spring arm 44 provides a force in a second direction opposite to the first direction. Furthermore, in the described embodiments, the outlet for the acoustical path 20 provided in the cover 16 comprises the first end 36 of the hollow hinge pin 34 that communicates with the internal passageway 14 provided in the body member 12.

Importantly, the above-described invention embodying the present invention eliminates the opening and closing of the acoustical channel through the flip hinge and replaces it with a sealed enclosed channel through the hinge that remains open even when the flip cover is closed. This feature eliminates blockage of the channel by debris that could become entrapped if the channel were open when the cover was closed. Additionally, loss of acoustical transmission quality has been virtually eliminated by the coaxially aligned rotating contact between tightly abutting surfaces of the cover 16 and the body member 12. Tests have shown that when at least one of the mating components is formed of acetal resin, the acoustic seal between the cover 16 and body member 12 maintains its integrity after 10,000 cycles of opening and closing the flip cover 16. Also, the interference fit between the hinge pins 34 and the body member 12 is maintained even after significant extended use of the instrument.

Although the present invention is described in terms of a preferred exemplary embodiment, with specific illustrative key constructions of the hinged arrangement between the cover and body components of the instrument, those skilled in the art will recognize that changes in those constructions may be made without departing from the spirit of the invention. Such changes are intended to fall within the scope of the following claims. Other aspects, features, and advantages of the present invention may be obtained from a study of this disclosure and the drawings, along with the appended claims.

What is claimed is:

1. A radiotelephone, comprising:

a body member having an internal passageway extending inwardly from a defined surface of the body member;

a cover pivotally attached to said body member and rotatable about a predefined axis between a closed position at which said cover is disposed in covering relationship over at least a portion of said body member and an open position at which said cover is spaced from said at least a portion of said body member, said axis of rotation extending through predetermined portions of said body member and said cover, said cover having an internally disposed passageway having a first portion coaxially aligned with said predefined axis and a second portion in communication with said first portion of the passageway and an aperture extending from a selected surface of said cover to said second portion of the passageway;

a microphone disposed within said body member in communication with said passageway of the body member, said passageway of the body member having at least a portion thereof disposed in coaxial alignment with said axis of rotation of the cover and in communication with said first portion of the internally disposed passageway in said cover; and said body member having a recess forming a portion of said defined surface of the body member and being concentrically disposed with respect to said axis of rotation, and said cover including a hinge pin having an externally disposed first end with an opening formed therein in communication with said first portion of the internally disposed passageway in said cover, said externally disposed first end of the hinge pin being adapted to forcibly abut said recess of the body member when said cover is assembled to said body member, and a seal member disposed between the externally disposed first end of said hinge pin and said recess of the body member.

2. A radiotelephone, as set forth in claim 1, wherein said hinge pin in integrally formed with said cover.

3. A radiotelephone, as set forth in claim 1, wherein said seal member is formed of an elastomeric material and has a central bore providing communication between said first portion of the internal passageway in said cover and said inwardly extending passageway of the body member.

4. A radiotelephone, as set forth in claim 1, wherein said hinge pin has a second end internally disposed within said cover and is axially movable with respect to said cover in a direction along said axis of rotation.

5. A radiotelephone, as set forth in claim 4, wherein said radiotelephone includes a seal member disposed between said second end of the hinge pin and said cover.

6. A radiotelephone, as set forth in claim 5, wherein said seal member is formed of an elastomeric material and has a central bore forming a portion of said first portion of the internal passageway in said cover.

7. An apparatus for guiding sound into a radiotelephone, comprising:

a cover having a first end and a second end;

a means for hinging said cover to said radiotelephone at said first end, said means for hinging having an axis about which said cover rotates when hinged to said radiotelephone;

an acoustical path defined by at least one inlet for receiving sound at the second end of said cover, an outlet for transmitting sound out of said cover and aligned with said axis of the means for hinging, and a hollow section disposed in said cover connecting said at least one inlet with said outlet; and said means for hinging including a means for acoustically sealing said outlet of the acoustical path to an opening in said radiotelephone when said cover is hinged onto said radiotelephone.

8. An apparatus, as set forth in claim 7, wherein said outlet of the acoustical path comprises a hollow pin having a first surface facing said opening when said cover is hinged onto said radiotelephone, and a second surface facing a direction opposite said first surface, said pin being formed of a low-friction material.

9. An apparatus, as set forth in claim 8, wherein said hollow pin is fixed with respect to said cover.

10. An apparatus, as set forth in claim 8, wherein said hollow pin is moveable with respect to said cover.

11. An apparatus, as set forth in claim 9, wherein said means for acoustically sealing said outlet to an opening in said radiotelephone when said cover is hinged onto said radiotelephone comprises a first spring arm and a second spring arm, said first spring arm providing force in a first direction around said opening when said cover is hinged to said radiotelephone, and said second spring arm providing force in a second direction opposite said first direction when said cover is hinged to said radiotelephone.

12. An apparatus, as set forth in claim 10, wherein said means for acoustically sealing said outlet to an opening in said radiotelephone when said cover is hinged onto said radiotelephone comprises a hollow elastic gasket disposed between said second surface of said hollow pin and said cover.

* * * * *